(12) United States Patent
Qiu et al.

(10) Patent No.: US 11,650,297 B2
(45) Date of Patent: May 16, 2023

(54) LIDAR DEVICES

(71) Applicant: Shenzhen Suteng JuChuang Technologies Ltd. Co., Shenzhen (CN)

(72) Inventors: Chunxin Qiu, Shenzhen (CN); Letian Liu, Shenzhen (CN)

(73) Assignee: Suteng Innovation Technology Co., Ltd., Shenzhen (CN)

( * ) Notice: Subject to any disclaimer, the term of this patent is extended or adjusted under 35 U.S.C. 154(b) by 1054 days.

(21) Appl. No.: 16/185,420

(22) Filed: Nov. 9, 2018

(65) Prior Publication Data
US 2019/0146060 A1 May 16, 2019

(30) Foreign Application Priority Data

Nov. 10, 2017 (CN) .......................... 201711101992.7
Nov. 10, 2017 (CN) .......................... 201711101995.0
(Continued)

(51) Int. Cl.
*G01S 7/484* (2006.01)
*G01S 7/487* (2006.01)
(Continued)

(52) U.S. Cl.
CPC ............ *G01S 7/484* (2013.01); *G01S 7/4813* (2013.01); *G01S 7/4817* (2013.01);
(Continued)

(58) Field of Classification Search
CPC ...... G01S 7/484; G01S 7/4813; G01S 7/4817; G01S 7/4868; G01S 7/4876; G01S 7/497; G01S 17/10; G01S 7/499
See application file for complete search history.

(56) References Cited

U.S. PATENT DOCUMENTS

2002/0167655 A1    11/2002  Friedman et al.
2009/0051997 A1*   2/2009   Maeno .................... G01S 17/42
                                                                    359/214.1
(Continued)

FOREIGN PATENT DOCUMENTS

CN      104035097 A      9/2014
CN      105705964 A      6/2016
(Continued)

OTHER PUBLICATIONS

WO 2013014030 A1 .npl (Year: 2013).*
International Search Report dated Jan. 16, 2018 in the patent application PCT/CN2017/106697. 13 pages.

*Primary Examiner* — Isam A Alsomiri
*Assistant Examiner* — Sanjida Naser
(74) *Attorney, Agent, or Firm* — Rimon PC (57) ABSTRACT

The present application discloses improvements that can be implemented in a laser detection and ranging (LiDAR) device to achieve accurate obstacle detection and to reduce measurement errors. A LiDAR device uses laser beams to scan a surrounding region to detect and identify objects. In one embodiment, the LiDAR control system is configured to refine a scanning region based on scanning results. The LiDAR control system may divide a scanning region into multiple sub-areas for differentiated scanning efforts. For example, the LiDAR control system may select a sub-area for enhanced scanning, e.g., with increased resolution. Methods for achieving scanning accuracy, increasing signal robustness, and reducing reflective noises are also disclosed.

26 Claims, 10 Drawing Sheets

(30) Foreign Application Priority Data

| Jan. 30, 2018 | (CN) | 201810088861.8 |
| May 2, 2018 | (CN) | 201810407450.0 |
| Jul. 13, 2018 | (CN) | 201810769332.0 |
| Jul. 13, 2018 | (CN) | 201810770914.4 |

(51) Int. Cl.
*G01S 7/481* (2006.01)
*G01S 7/486* (2020.01)
*G01S 7/497* (2006.01)
*G01S 17/10* (2020.01)
*G01S 7/499* (2006.01)

(52) U.S. Cl.
CPC .......... *G01S 7/4868* (2013.01); *G01S 7/4876* (2013.01); *G01S 7/497* (2013.01); *G01S 17/10* (2013.01); *G01S 7/499* (2013.01)

(56) References Cited

U.S. PATENT DOCUMENTS

| 2009/0059766 A1* | 3/2009 | Yamada | G02B 26/101 |
| | | | 369/112.01 |
| 2018/0113200 A1* | 4/2018 | Steinberg | G01S 17/93 |
| 2018/0284247 A1* | 10/2018 | Campbell | G01S 7/4808 |

FOREIGN PATENT DOCUMENTS

| CN | 105785381 A | 7/2016 | |
| CN | 105824029 A | 8/2016 | |
| CN | 206362927 U | 7/2017 | |
| CN | 107153193 A | 9/2017 | |
| EP | 0665446 A2 | 8/1995 | |
| JP | 2010091855 A | 4/2010 | |
| WO | WO-2013014030 A1 * | 1/2013 | .......... B23K 26/082 |

* cited by examiner

LIDAR DEVICES

RELATED APPLICATIONS

This US utility application claims priority under the Paris Convention to Chinese Patent Application CN201711101995.0 filed on Nov. 10, 2017 and titled LIDAR CLOSED-LOOP CONTROL SYSTEM, LIDAR DEVICE, AND LIDAR CONTROL METHOD, Chinese Patent Application CN201711101992.7 filed on Nov. 10, 2017 and titled LIDAR DEVICE AND LIDAR CONTROL METHOD, Chinese Patent Application CN201810088861.8 filed on Jan. 30, 2018 and titled LIDAR DEVICE AND LIDAR CONTROL METHOD, Chinese Patent Application CN201810407450.0 filed on May 2, 2018 and titled METHOD OF INTERFERENCE REDUCTION IN LIDAR DEVICE AND ANTI-INTERFERENCE LIDAR DEVICE, Chinese Patent Application CN201810769332.0 filed on Jul. 3, 2018 and titled LIDAR DEVICE AND LIDAR CONTROL METHOD, Chinese Patent Application CN201810770914.4, filed on Jul. 13, 2018 and titled PREAMBLE SIGNAL SUPPRESSION IN CO-AXIAL LIDAR DEVICE AND METHOD OF PREAMBLE SIGNAL SUPPRESSION, the content of all six patent applications being incorporated herein in their entirety.

FIELD OF THE INVENTION

The present disclosure relates generally to laser detection and ranging (LiDAR) devices, and more specifically to improvements in LIDAR devices for achieving better accuracy and reducing measurement errors.

BACKGROUND OF THE INVENTION

In a laser detection and ranging device (LiDAR device), laser beams are used as light sources to generate a map of a surrounding area. Generally, a LiDAR device emits one or more laser beams and detects laser beams that are reflected by an object in the surrounding area. By calculating the time difference between the emission time of a laser beam and detection time of a reflected laser beam, a LiDAR device can measure the distance of the reflection point on the object. After collecting distance data on multiple points located on the object, the LiDAR device can map the surface of the object. Used on driverless cars, LiDAR devices coupled with Artificial Intelligence can accomplish object recognition and obstacle avoidance.

However, a LiDAR device is susceptible to light interference and disturbance coming from the environment. A LiDAR device can also be affected by internal light noises generated by reflective surfaces of optical equipment, e.g., lenses, prisms, beam splitters, etc., that is inside the LiDAR device. Such interference and noises reduce the sensitivity of a LiDAR device and make it more error prone. In the case of autonomous driving vehicles, accurate, reliable, and real-time obstacle detection and avoidance is crucial in ensuring road safety.

The present application teaches an advanced LiDAR device in which sophisticated control methods and robust optical systems are utilized to enhance accuracy and improve reliability.

SUMMARY OF THE INVENTION

Accordingly, it is an objective of the present disclosure to teach an advanced LiDAR device with improved accuracy and reliability.

In some embodiments, a LiDAR device is disclosed to comprise a light source, a light receiver, a mirror system, and a control system. The light source comprises a plurality of laser emitters that are configured to generate an outgoing laser beam. The light receiver comprises a plurality of photon detectors and is configured to detect a returned incoming laser beam. The mirror system is configured to change an outgoing direction of the outgoing laser beam. The control system is configured to control the LiDAR device. The control system may command the LiDAR device to direct the outgoing laser beam to scan a selected region. When the outgoing laser beam hits an object in the selected region, the laser beam is reflected toward the LiDAR device and may be detected by the light receiver. The returned laser beam is received and collected to generate a scanning result. In one embodiment, the control system is configured to adjust the mirror system based on a previously obtained scanning result of the selected region. In one embodiment, the control system may transmit a reference signal or command to control the LiDAR device to refine the selected region for enhanced scanning.

In one embodiment, based on the scanning result, the control system divides the selected region into multiple sub-areas and may choose one or more sub-areas for enhanced scanning, for example, with increased resolution. In one embodiment, the control system may select a priority zone from the multiple sub-areas. The priority zone may be scanned with laser beams of stronger power, higher frequencies, and/or shorter pulses to achieve higher resolution.

In one embodiment, the priority zone may be selected to include a detected object. The priority zone may be scanned with enhanced resolution or accuracy to produce finer details about the detected object.

In one embodiment, one or more sub-areas may be categorized as mistakes or error zones because there is no objected detected in those sub-areas. In another embodiment, an error zone may be determined among the multiple sub-areas in which no object is detected. In some embodiments, the LiDAR system may be configured to report an error message when an error zone is identified.

In one embodiment, one or more sub-areas may be categorized as error zone because the object detected in that area may prove to be mistake or inconsequential. In yet another embodiment, the LiDAR control system may be configured to adjust the scanning region to include a detected object. The LiDAR control system may be further configured to control the laser beam to scan the adjusted scanning region with increased resolution.

In some embodiments, a LiDAR device comprises one or more sensors. The sensors are light sensors. They may be placed in a predicted trajectory of a laser beam to detect the path of the laser beam. The detected path of the laser beam is then compared with a pre-determined laser beam path. If there is deviation by the detected path from the pre-determined path, the control system of the LiDAR device adjusts the mirror system to correct the path of the laser beam. In one embodiment, the control system may adjust an angle of the mirror system for correction. In another embodiment, the control system may adjust a pulse period and/or frequency of the laser beam.

In some embodiments, a LIDAR device comprises one or more lens systems. In one embodiment, the LiDAR device comprises a lens system positioned in between the light source and the mirror system. The lens system comprises a polarizing splitter and a quarter-wave plate. The polarizing splitter is configured to split the collimated laser beam into a p-polarized laser beam and an s-polarized laser beam. The quarter-ware plate is configured to convert the p-polarized laser beam into circulation polarization. In a co-axial LiDAR device, the lens system is also in front of the light receiver on the return path of one or more incoming laser beams. The incoming laser beams are of circulation polarization. The quarter-wave plate converts the circular polarization of the incoming laser beams into s-polarization. The polarizing splitter splits the s-polarized laser beam and redirects a split s-polarized laser beam to the light receiver. In one embodiment, the lens system further comprises a filter to substantially remove noise.

In some embodiments, to reduce noises generated by the various optical equipment inside a LiDAR device, one or more light absorption plates may be placed on the interior walls of the LiDAR device. The light absorption plates are configured to absorb the reflected and refracted light noises generated by reflective surfaces of the optical equipment when the laser beams pass through them.

In some embodiments, a LiDAR system control method is disclosed. The LiDAR system comprises a light source for generating an outgoing laser beam, a light receiver for detecting incoming laser beams and a control system. The control system is configured to select a scanning region first, and then to position the mirror system to direct the outgoing laser beam towards the scanning region. The control system controls the mirror system to move the outgoing laser beam to scan the selected scanning region. The control system is further configured to analyze received incoming laser beams when the outgoing laser beam scans the selected scanning region and refine the selected scanning region for enhanced scanning.

In one embodiment, the control system is configured to divide the selected scanning region into multiple sub-areas and select one or more sub-areas for enhanced scanning with higher resolution. Among the multiple sub-areas, the control system may designate a sub-area as error zone because no object within the error zone is detected. In another embodiment, the control system may refine the selected scanning region by selecting a priority zone within the selected scanning region for enhanced scanning. The priority zone may be selected to cover a detected object.

In some embodiments, the LiDAR device further comprises one or more sensors that placed to detect a path of the outgoing laser beam. The control system is configured to compare the detected path of the outgoing laser beam with a pre-determined path and adjust the mirror system based on the comparison. For example, the control system may direct the LiDAR device to adjust an angle of the mirror system. If the mirror system comprises a MEMS device, the control system may be configured to increase the voltage applied on the MEMS device. For another example, the control system may direct the LiDAR device to change a time interval between pulses of the outgoing laser beam.

In some embodiments, the LiDAR device is configured to generate periodic laser beam pulses according to a code table. A code table is a sequence of codes and each laser beam pulse represents a code sequentially selected from the code table. The coded outgoing laser beam is transmitted and reflected by a nearby object. The reflected laser beam is received by the LiDAR device and is de-coded. Because each laser pulse represents a code in the code table, the received laser pulse can be matched to its corresponding outgoing laser pulse. The time difference between the reception and transmission of the same laser pulse can be used to determine the distance of the reflection point. Because adjacent laser pulses are distinctively coded, emitted and received laser pulses of different codes will not be mismatched. Therefore, time difference, hence distance, can be determined accurately, even in an environment with high noise level or in a complex terrain. For example, when a laser pulse is received but no outgoing laser pulse (e.g., transmitted within a pre-defined time limit) matches the code of the received laser pulse, the received laser pulse is treated as noise. For another example, the control system may specify an expected time interval for receiving a next laser beam pulse. If the next laser beam pulse is received after the expected time interval or if no laser beam pulse is received within the expected time interval, the receive laser pulse is treated as noise.

In one embodiment, each code in the code table represents a power level to be used by the light source for generating a laser pulse. In another embodiment, each code in the code table represents the time interval to be used by the light source for generating two consecutive laser pulses.

In some embodiments, a control method of a LiDAR system is disclosed. The control method comprises selecting a scanning region based on a previously scanning result and then positioning the mirror system to direct the outgoing laser beam towards the selected scanning region. The method further comprises controlling the mirror system to move the outgoing laser beam or changing a direction of the outgoing laser beam to scan the selected scanning region. When the outgoing laser beams are reflected, they become incoming laser beams to the LiDAR system. The incoming laser beams are received and analyzed. In one embodiment, the analysis may be performed after the scanning of the selected region is finished. In one embodiment, the analysis may be performed during the scanning of the selected region. Based on the analyzing results, the scanning region may be refined and a refined region may be selected for enhanced scanning.

In some embodiments, the control method comprises dividing the scanning region into multiple sub-areas based on the analyzing results. One or more of the multiple sub-areas are selected for enhanced scanning, for example, with increased resolution. In one embodiment, the analyzing results may indicate that an object is inside the scanning region. The control method comprises selecting a priority zone that covers the detected object and scanning the priority zone with increased resolution compared to the resolution used outside the priority zone. In one embodiment, the control method may comprise determining an error zone in which no object is detected.

In some embodiments, sensors are used to collect data for use in the control method. For example, light sensors may be placed to detect a path of the outgoing laser beam. The detected path is compared to a pre-determined path. The mirror system of the LiDAR device can be adjusted based on the comparison. For example, an angle of the mirror system may be adjusted. If the mirror system comprises a MEMS device, the angle of the mirror system can be adjusted by changing a voltage applied on the MEMS device. In one embodiment, the control method may adjust the mirror system and the light source based on the comparison. For example, the control method may adjust a time interval between the outgoing laser beam pulses.

In some embodiments, the control method further comprises encoding outgoing laser beams to reduce interference and increase robustness. In one embodiment, a code table is used to encode outgoing laser beams. The code table contains a series of codes. Each code may be a power level or a time interval that can be used to modulate the outgoing laser beams. Each laser pulse is encoded with a code sequentially selected from the code table. In one embodiment, a received laser pulse is decoded first to determine the code. Then the corresponding outgoing laser pulse of the received laser pulse is identified using the code. The time difference between the transmitting time of the outgoing laser pulse and the arrival time of the incoming laser pulse is calculated. The time difference is used to determine the distance between the LiDAR system and the object upon which the incoming laser beam pulse is reflected based on the time difference. Such encoded laser beam is more robust against interference. For example, the outgoing laser beam pulse and the incoming laser beam pulse can be accurately paired up. For an incoming laser beam pulse, if the corresponding outgoing laser beam pulse cannot be identified, the incoming laser beam pulse may be treated as noise. In one embodiment, an expected time interval between two consecutive laser pulses is determined, e.g., based on the code table, if a next laser pulse is not received within the expected time interval, the received laser pulse is treated as noise.

In some embodiments, a LiDAR control system is disclosed. The LiDAR control system comprises a LiDAR device, a detection module, and a control module. The LiDAR device comprising a light source, a light receiver and a mirror system. The detection module is configured to send detection signals to a scanning region and to receive returned detection signals. The control module is configured to control the LiDAR device by generating a reference signal based on data collected on the returned detection signals. The control module sends a reference signal to the LiDAR device to control the LiDAR device. The detection signals may be radar, laser, or optical signals. The reference signal may be used by the control module to direct the LiDAR device to scan with high resolution. The reference signal may be used by the control module to control the mirror system of the LiDAR device to scan a selected region with high resolution.

BRIEF DESCRIPTION OF THE DRAWINGS

These and other features of the present disclosure will become readily apparent upon further review of the following specification and drawings. In the drawings, like reference numerals designate corresponding parts throughout the views. Moreover, components in the drawings are not necessarily drawn to scale, the emphasis instead being placed upon clearly illustrating the principles of the present disclosure.

DETAILED DESCRIPTION

Embodiments of the disclosure are described more fully hereinafter with reference to the accompanying drawings, in which preferred embodiments of the disclosure are shown. The various embodiments of the disclosure may, however, be embodied in many different forms and should not be construed as limited to the embodiments set forth herein. Rather, these embodiments are provided so that this disclosure will be thorough and complete, and will fully convey the scope of the disclosure to those skilled in the art.

Figure 1A:
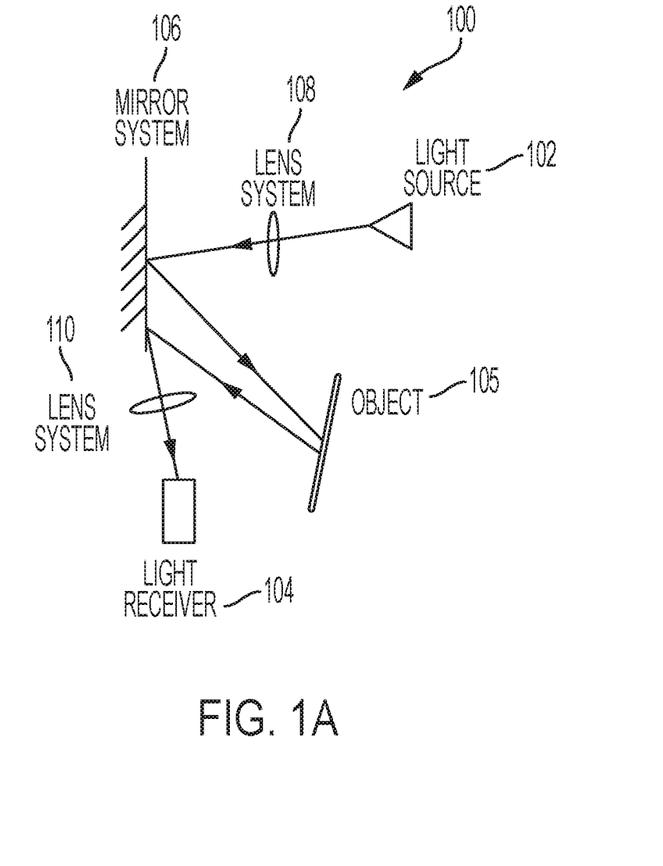
FIGS. 1a and 1b are illustrations of an exemplary co-axial and a bi-axial LiDAR device.

In referring to FIG. 1a, an exemplary co-axial LiDAR system 100 is shown to comprise a light source 102, a light receiver 104, a mirror system 106, lens systems 108 and 110. The light source 102 comprises a plurality of laser emitters, each emitting a laser beam directed at the mirror system 106. In some embodiments, a lens system 108 may be placed in the path of the laser beams before the mirror system 106. The lens system 108 may comprise collimators that are used to collimate the laser beams from the laser emitters to ensure that the laser beams are focused and aligned before the laser beams reach the mirror system 106.

The mirror system 106 is configured to direct the laser beams coming from the light source 102 towards a desired target region. For example, a desired target region may be a region that needs to be scanned for objects or obstacles. The laser beams, after being reflected by the mirror system 106, form outgoing laser beams directed towards the target region for image recognition and obstacle detection, for instance, to detect objects, pedestrians, or obstacles.

In one embodiment, the mirror system 106 may comprise a Micro-Electro-Mechanical System (MEMS) mirror. The MEMS mirror is configured to change its orientation to reflect a laser beam towards a desired direction to form an outgoing laser beam. In some embodiments, the MEMS mirror may be controlled to continuously change its orientation. The oscillating movement of the MEMS mirror may be described as a combination of rotation around an axis in the zenith direction and vibration around an axis perpendicular to the zenith axis. The continuous oscillation of the MEMS mirror permits the outgoing laser beam to continuously scan a target region, for example, an area in the shape of square.

In the process of scanning a target region, an outgoing laser beam may hit an object 105 located in the target region that reflects the outgoing laser beam back towards the mirror system 106. A reflected outgoing laser beam becomes an incoming laser beam. As shown in FIG. 1a, the path of the incoming laser beam substantially coincides with the patch the outgoing laser beam. The incoming laser beam travels towards the mirror system 106 before being reflected and received by the light receiver 104. In some embodiments, the lens system 110 placed in between the mirror system 106 and the light receiver 104. The lens system 110 may comprise focusing devices that are configured to focus incoming laser beams onto respective light receivers.

Figure 1B:
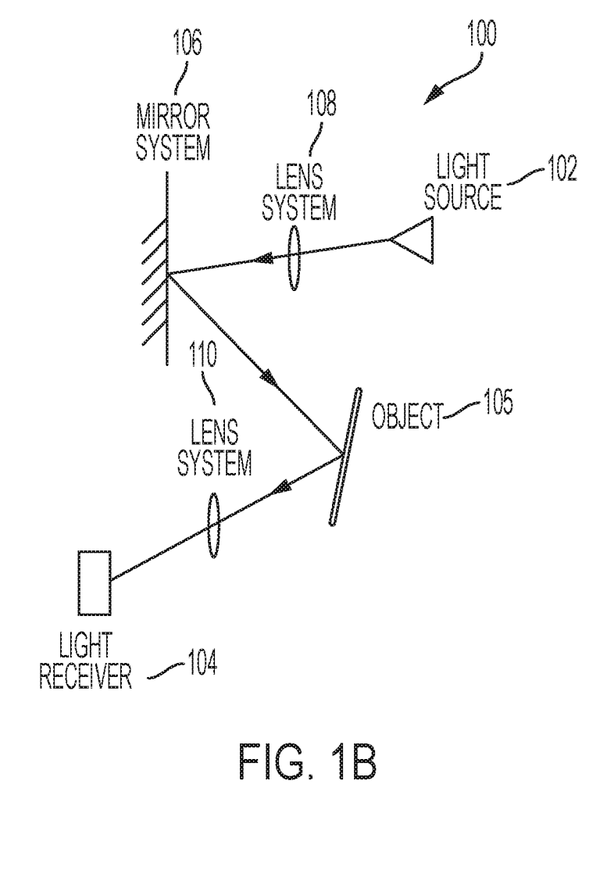

The LiDAR system shown in FIG. 1a is also referred to as co-axial because the path of the incoming laser beam and the path of the outgoing laser beam substantially coincides. In some embodiments, the path of the incoming laser beam and that of the outgoing laser beam do not coincide as shown in FIG. 1b. In FIG. 1b, the incoming laser beam coming from the target region goes through a lens system 110 before reaching the light receiver 104. The lens system 110 may include focusing devices that are configured to focus the incoming laser beams onto the light receiver 104.

In the LiDAR system 100, the mirror system may comprise one or more MEMS mirrors that are configured to steer outgoing laser beams onto a target region. In some embodiments, multiple laser emitters share one MEMS mirror. The movement of the MEMS mirror is controlled by the LiDAR control system 200 (see FIG. 2).

LiDAR systems can be divided into two types: co-axial and bi-axial. In a co-axial LiDAR system, the emission path of the light source coincides with the path of the incoming laser beam. In a bi-axial LiDAR system, the emission path of the light source and the path of the incoming laser beam are separate. In FIG. 1*a*, the LiDAR system may be viewed as a co-axial system, and in FIG. 1*b*, the LiDAR system may be viewed as a bi-axial system. In both figures, the LiDAR system is bistatic because the light source and the light receiver are separately located. In a monostatic LiDAR system, the light source and the light receiver are collocated. In a monostatic coaxial LiDAR system, the light source and the light receiver are collocated and the lens systems 108 and 110 may be combined into one lens system.

In the present disclosures, several improvements to conventional LiDAR systems are disclosed. Some of the improvements may be more suitable or more effective when implemented in a co-axial system than in a bi-axial system. Or vice versa. Some of the improvements may be proposed to address a particular problem found in one type of LiDAR systems. But such improvements are not limited to that particular type of LiDAR systems. They can be implemented in a different type of LiDAR systems to solve the same or different problem.

Figure 2:
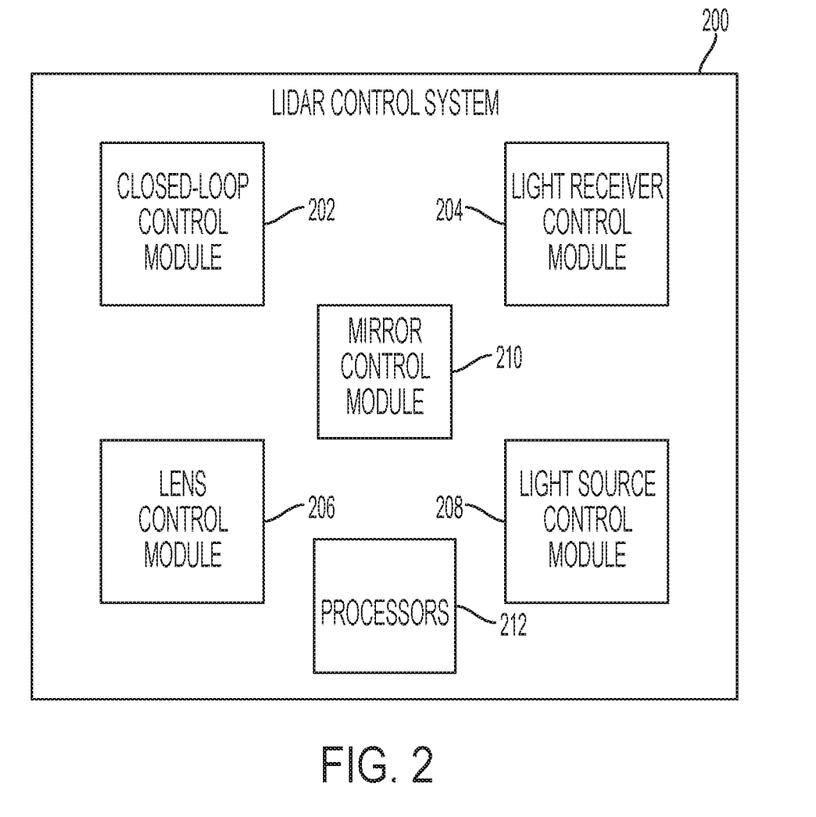
FIG. 2 is a block diagram of an exemplary LiDAR control system.

FIG. 1*a* and FIG. 1*b* illustrate the different optical parts of a LiDAR system, which are controlled by a LiDAR control system. FIG. 2*b* is a block diagram illustrating the different modules in an exemplary LiDAR control system 200. The LiDAR control system 200 is configured to control and coordinate the light source 102, the light receiver 104, the mirror system 106, and the one or more lens system 108 and 110. The LiDAR control system 200 comprises six modules. They are: closed-loop control module 202, light receiver control module 204, lens control module 206, light source control module 208, mirror control module 210 and processors 212. (For simplicity, storage devices are not shown in FIG. 2.) The different modules may be configured control different components of the LiDAR system 100 respectively. And the processor 212 controls the various modules in the LiDAR control system 200. For example, the mirror control module 210 is configured to adjust the position and orientation of the mirror system 106. In some embodiments, the mirror system 106 may comprise MEMS devices. Orientation of a MEMS mirror can be shifted by changing the voltage applied on the MEMS device. The mirror control module 210 may be configured to increase or decrease the voltage applied on the MEMS device to adjust the angle of the MEMS mirror, upon receiving command signals from the processors 212.

The light source control module 208 is configured to control the light source 102. In some embodiments, the light source control module 208 controls the plurality of laser emitters included in the light source 102. Generally, the laser emitters and the mirror system 106 are coordinated. For example, the mirror system 106 may comprise a MEMS mirror that oscillates and/or rotates to direct laser beams to different directions according to command signals received from the processors 212. Laser beams emitted by the light source are pulses transmitted periodically. The time interval between two consecutive laser pulses (i.e., the frequency of the laser pulses) may be configured based on the oscillation frequency of the MEMS mirror in order to ensure that regions of interests are scanned by the laser beams and that enhanced scanning is available when certain regions are designated as important.

The light receiver control module 204 is configured to control the light receiver 104 and the plurality of photon detectors in the light receiver 104. Information, such as arrival time, about the incoming laser beams received by the phone detectors is sent to the processors 212 for data processing and analysis and for generate scanning results. In some embodiments, the processors 212 may be configured to decode the incoming laser beams. And the lens control system 206 may configured to control both the lens system 108 placed in the emission path and the lens system 110 placed in the reception path.

In some embodiments, the processors 212 analyze the information received from the light receiver 104 about the received laser beams and generate scanning results about surrounding environment. The processors 212 may provide the scanning results to the closed-loop control module 202 as feedback. Based on the scanning results, the closed-loop control module 202 can control the different components in the LiDAR system 100, either directly or via the different control modules in the LiDAR control system 200 described above.

Figure 3A:
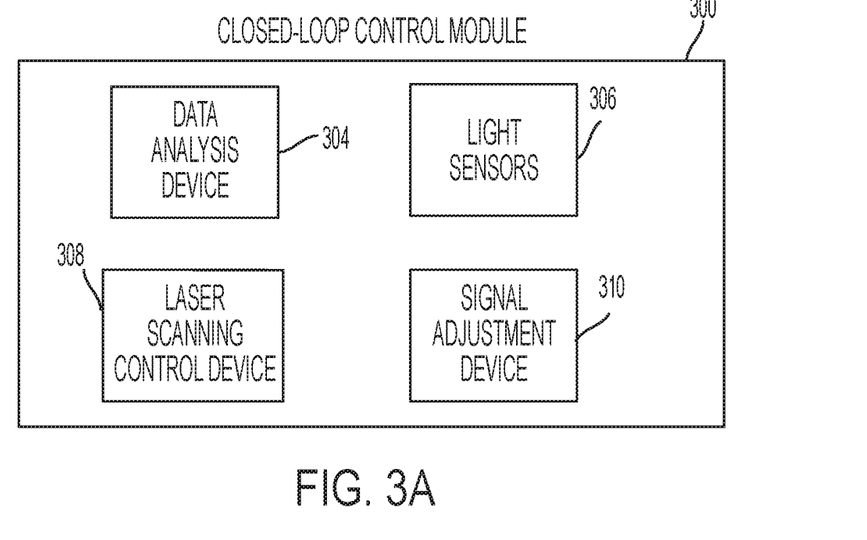
FIGS. 3a-3b are block diagrams of an exemplary LiDAR closed-loop control module.

FIG. 3*a* illustrates a block diagram of an exemplary LiDAR closed-loop control module 300. The closed-loop control module 300 comprises a data analysis device 304, light sensors 306, a laser scanning control device 308, and a signal adjustment device 310. It is noted that term "module" and "device" used in the present disclosure may refer to hardware (CPU, I/O devices, memories, etc.) or software (embedded, firmware, applications, etc.) implemented on hardware that is manufactured or programmed to accomplish the tasks described herein or to implement the functionalities described herein.

In some embodiments, the closed-loop control module 300 may further include a detection signal/reference signal transceiver 302 (not shown) for transmitting and receiving detection signals, which are used by the LiDAR control system to collect data and reference signals, which are used to control the LiDAR device based on the collected data.

In FIG. 3*a*, the closed-loop control module 300 further comprises a data analysis device 304 configured to process and analyze the scanning results received from the processors 212. For example, the scanning results may be analyzed to identify objects inside the scanning region. If an object is found in the scanning region partially, the closed-loop control module 300 may decide that the scanning region needs refinement or adjustment. The closed-loop control module 300 may further determine a refined scanning region based on the scanning results. In some embodiments, the closed-loop control module 300 is configured to transmit a reference signal to the laser scanning control device 308 to control the laser emitters to scan the refined scanning region.

In some embodiments, the closed-loop control module 300 may divide the scanning region into multiple sub-areas based on the scanning results. In one embodiment, one or more sub-areas may be designated as error zone when there is no object is detected in those areas. In one embodiment, one or more sub-areas may be designated as priority zone for enhanced scanning.

During enhanced scanning, the closed-loop control module may direct the LiDAR system 100 to scan a priority zone with increased resolution. In some embodiments, enhanced scanning may be accomplished by using stronger laser beams. In some embodiments, enhanced scanning may be accomplished by using higher frequency laser pulses (i.e., shorter time interval between pulses). In some embodiments, enhanced scanning may be accomplished by switching to a different light source, e.g., laser emitters that generate lasers of shorter wavelengths. To implement enhanced scanning, the LiDAR system 100 may be configured to coordinate the data analysis device 304, the laser scanning control device 308, and the signal adjustment device 310. The signal adjustment device 310 may be configured to control the laser emitters to emit laser beams in accordance to the analysis of the scanning results by the data analysis device 304. For example, the signal adjustment device 310 may direct the laser emitters to change the time interval between two laser pulses, to increase the power level of laser pulses, etc. The laser scanning control device 308 may be configured to control the mirror system 106 to adjust its position and orientation in order to direct laser beams to a priority zone for enhanced scanning.

In some embodiments, the closed-loop control module 300 further comprises multiple light sensors 306. The light sensors 306 may be placed in an emission path of an outgoing laser beam and can be used to detect the trajectory of an outgoing laser beam. The reading results from the light sensors 306 may be transmitted to the data analysis device 304 for analyzing. In some embodiments, if the outgoing laser beam is detected to be behind a pre-defined trajectory, the closed-loop control module 300 may direct the laser scanning control device 308 to compensate for the delaying effect, e.g., by decreasing the voltage applied to the mirror system 106. If the outgoing laser beam is detected to be ahead of a pre-defined trajectory, the closed-loop control module 300 may direct the laser scanning control device 308 to compensate for the speeding effect, e.g., by increasing the voltage applied to the mirror system 106.

Figure 3B:
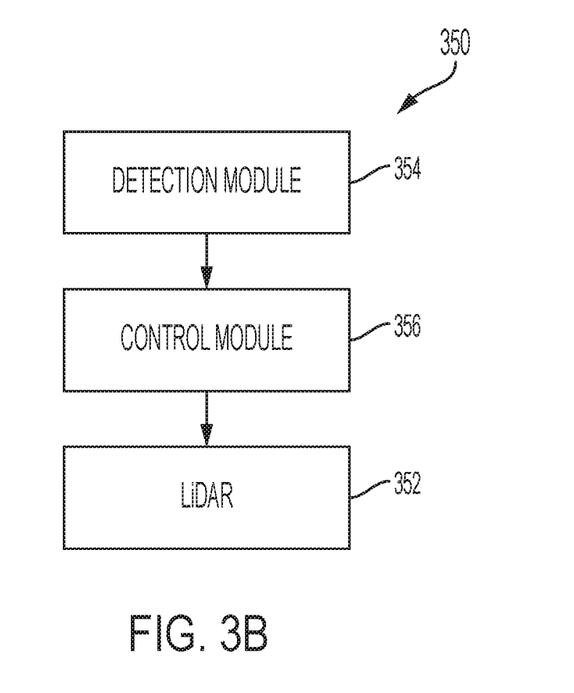

FIG. 3b illustrates another exemplary LiDAR control system 350. In FIG. 3b, the exemplary LiDAR control system 350 comprises a LiDAR device 352, a detection module 354, and a control module 356. The LiDAR device 352 comprises a light source, a light receiver, a mirror system and a control system (not shown). The detection module 354 is configured to send detection signals and receive returned detection signals. The control module 356 is configured to generate reference signals based on the returned detection signals. The reference signals are used to control the LiDAR device 352. In one embodiment, the reference signal may direct the LiDAR device 352 to select a scanning region for enhanced scanning, for example, with increased resolution. In one embodiment, the reference signal may direct the LiDAR device 352 to adjust its mirror system so the scanning laser beams are directed to the selected region.

Figure 4:
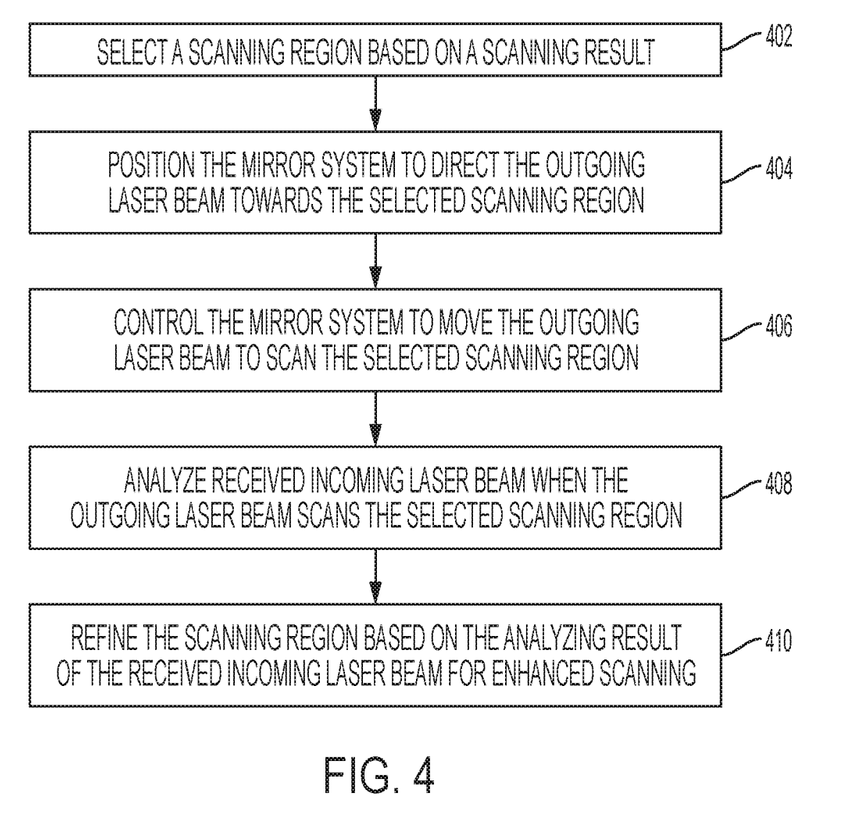
FIG. 4 is a flow chart of an exemplary LiDAR closed-loop control method.

The closed-loop control module 300 is configured to adjust the LiDAR system based on previously obtained scanning results to achieve better object identification and recognition. FIG. 4 is a flow chart illustrating an exemplary control process implemented by the closed-loop control module 300. In the exemplary control process, the closed-loop control module 300 first selects a scanning region (step 402). The control module 300 then positions the mirror system 106 to direct the outgoing laser beam or beams towards the selected scanning region (step 404), and control the mirror system 106 to move the outgoing laser beam to scan the selected scanning region (step 406). After the outgoing laser beam are reflected backward and received by the light receiver 104, the control module 300 analyzes the received incoming laser beam or beams (step 408). The control module 300 then refines the scanning region based on the analyzing result (step 409). The refined scanning region is identified for enhanced scanning.

Figure 5:
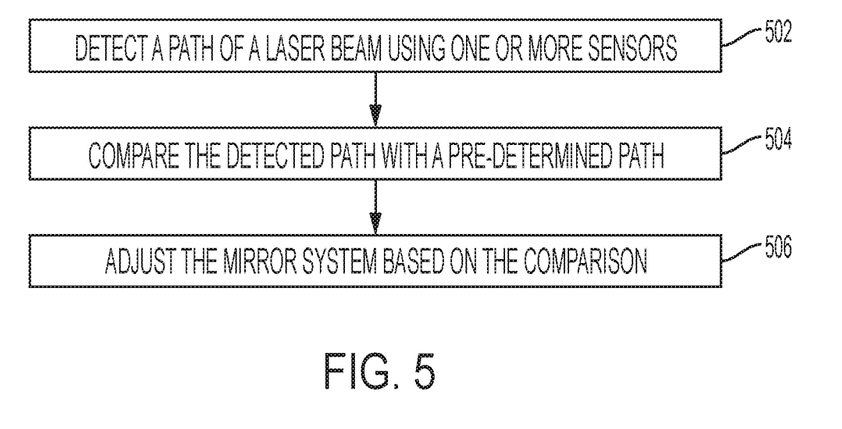
FIG. 5 is a flow chart of an exemplary method of generating coded laser beams in a LiDAR device.

The closed-loop control module 300 is configured to identify regions that are important or need better resolution based on previously obtained scanning results. After identifying those regions, the control module 300 directs the LiDAR system 100 to conduct enhanced scanning of those regions. The closed-loop control module 300 may be configured to adjust the LiDAR system 100 based on other data, for example, data collected by light sensors 306. FIG. 5 illustrates a flow chart of an exemplary control process based on data collected from the light sensors 306.

As described above, the light sensors 306 are placed in the emission path of the outgoing laser beams. The light sensors 306 can detect a path of a laser beam (step 502). The control module 300 then compares the detected path with a pre-determined path (step 504). Based on the comparison, the control module 300 adjusts the mirror system 106 to correct the path of the laser beam so the laser beam substantially follows the pre-determined path.

Figure 6:
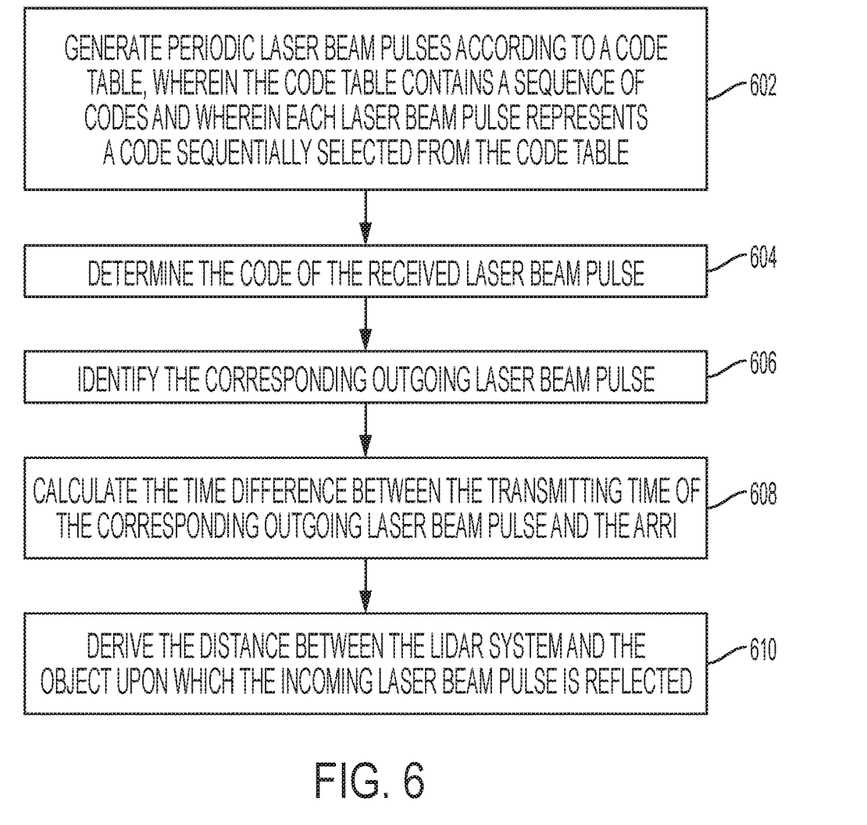
FIG. 6 is a flow chart illustrating an exemplary method of correcting a LiDAR device based on detected laser beam trajectory.

The closed-loop control module 300 adjusts the LiDAR system 100 based on collected data, e.g., scanning results or trajectory of laser beams. The closed-loop control module 300 is configured to improve scanning effects. Other methods can also be implemented to improve the LiDAR system 100. For instance, when one or more objects in the surrounding environment have irregular reflective surfaces, the outgoing laser beams may be reflected into different direction by these reflective surfaces, sometimes multiple times, creating a "noisy" environment. When these noises are received by the light receiver 104, they may be confused with real signals. To improve signal-to-noise ratio, laser beams may be encoded to combat noises, similar to wireless technology. FIG. 6 illustrates an exemplary method of encoding an outgoing laser beam to improve the robustness of LiDAR system's signal processing.

As shown in FIG. 6, the LiDAR system 100 is configured to generate periodic laser beam pulses according to a code table. The code table may include a sequence of codes and each laser beam pulse is generated to represent a code sequentially selected from the code table (step 602). When a laser beam pulse is received, the LiDAR system 100 decodes the received pulse to determine the code of the received laser beam pulse (step 604). Based on the code, the LiDAR system 100 tries to identify the corresponding outgoing laser beam pulse (step 606). By pairing the outgoing laser beam pulse and the received laser beam pulse using the code, the LiDAR system 100 can easily distinguish what is noise and what is useful signal. In one embodiment, if an incoming laser beam pulse cannot be paired with a previously transmitted outgoing laser beam (this may due to a pre-determined time interval that has elapsed), the received laser beam pulse is treated as noise. Recall that noises are often created by reflective surfaces that may re-direct the outgoing laser beam multiple times. Noises are often delayed pulses that take a tortuously long route. In one embodiment, if a next laser pulse is not received within a pre-determined expected time interval of a previously received laser pulse, the previously received laser pulse is treated as noise.

In some embodiments, the code table includes individual codes with each code indicating how the power of an individual laser beam is varied, which is analogous to amplitude-modulated radio signal. In some embodiments, the code table includes codes that indicate how the time interval of consecutive laser beam pulses is varied, which is analogous to frequency modulated radio signals.

Noises can come from reflective surfaces in a surrounding environment as explained above. Noises can also come from reflective surfaces inside the LiDAR system 100, as the lens system illustrated in FIGS. 7a-7b and FIG. 8.

Figure 7A:
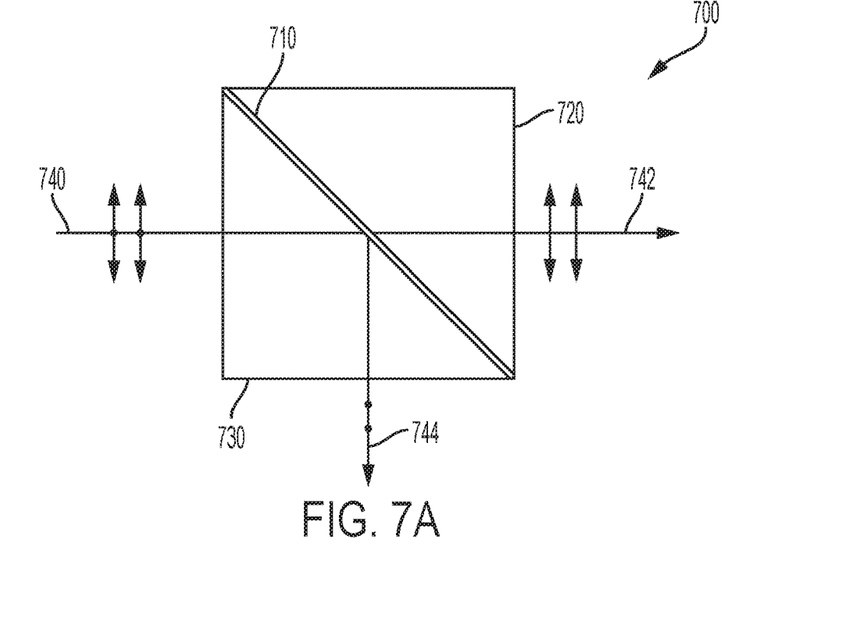
FIGS. 7a-7b illustrate an exemplary optical system used in a LiDAR device.
Figure 7B:
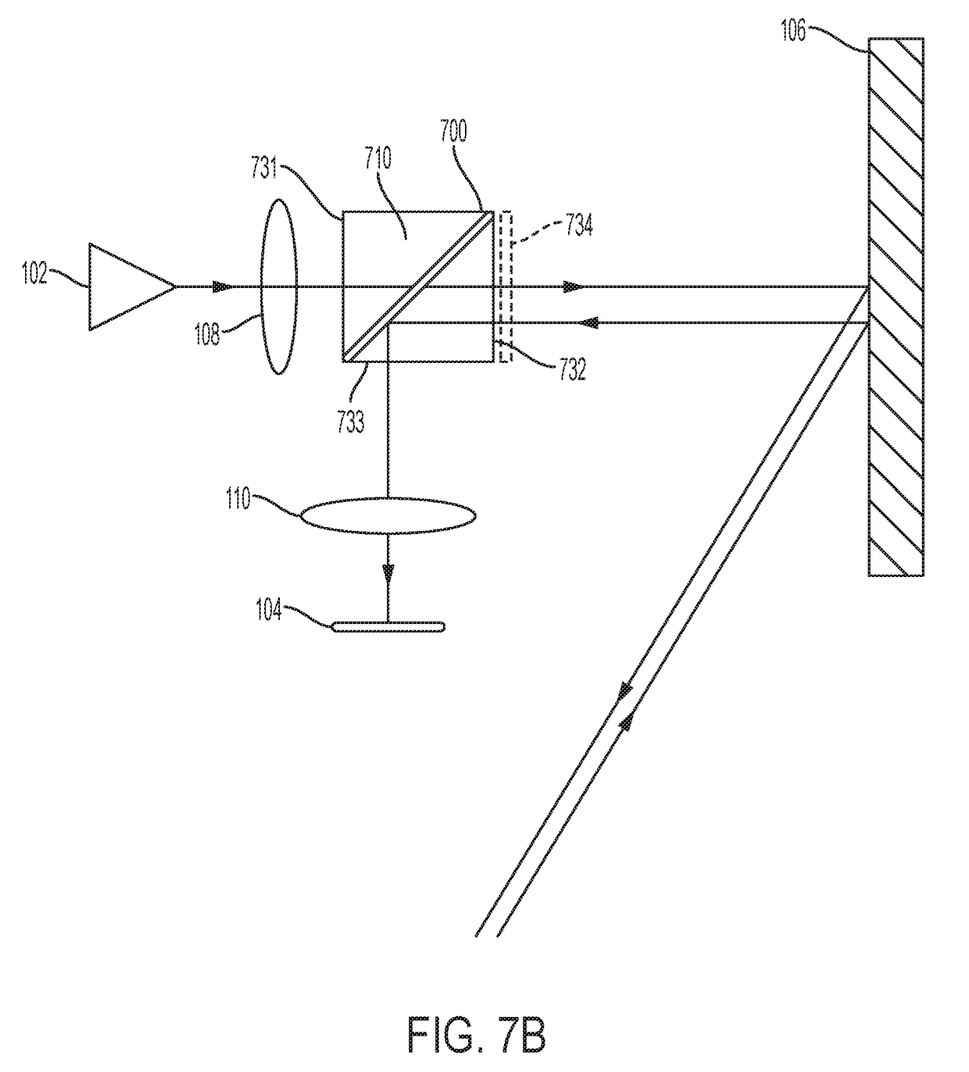

FIGS. 7a-7b illustrate an exemplary lens system used in a co-axial bistatic LiDAR system 100. In a co-axial LiDAR system 100, the emission path and the reception path coincide substantially. The outgoing laser beam and the incoming laser beam are split by a beam splitter 710. Further, the beam splitter 710 is a polarizing splitter. The incoming laser beam 740 is circularly polarized. After the polarizing splitter 710, the p-polarization portion of the incoming laser beam 740 becomes beam 742 and exits the surface 720. The s-polarization portion of the incoming laser beam becomes beam 744 and exits the surface 730.

FIG. 7b illustrates the entire light path of the co-axial bistatic LiDAR system. The outgoing laser beam emitted by the light source 102 first goes through the lens system 108, which may include a collimation device to collimate the outgoing laser beam. The outgoing laser beam enters the polarization splitter 710 through the surface 731. The polarization splitter 710 splits the outgoing laser beam into p-polarization and s-polarization and the p-polarization portion exits the splitter 710 through the surface 732. Next to the surface 732, a quarter-wave plate 734 is placed to convert the p-polarization laser beam into circularly polarized outgoing laser beam. The outgoing laser beam is then re-directed by the mirror system 106 to a scanning region. After being reflected by an object in the scanning region, the outgoing laser beam is returned substantially along the emission path. The incoming laser beam reaches the mirror system 106 and is directed to the splitter 710. The incoming laser beam is circular polarized and is converted into s-polarization by the quarter-wave plate 734. The s-polarization incoming laser beam is directed by the beam splitter towards the surface 733. The incoming laser beam comes out of the surface 733 and reaches the light receiver 104 via the lens system 110.

Figure 8:
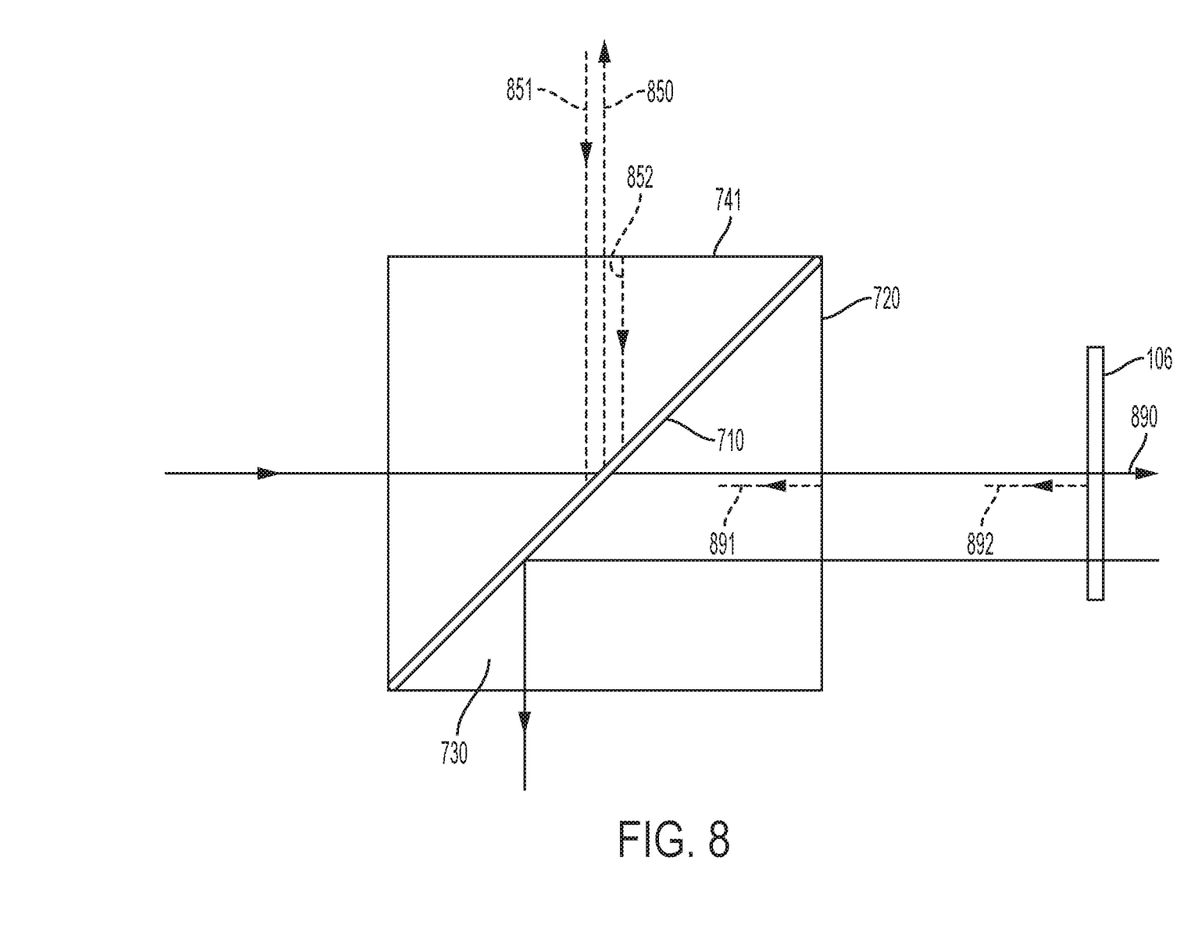
FIG. 8 illustrates different reflective and refractive light noises inside a LiDAR device.

The optical system 700 illustrated in FIG. 7b prevents mixing of outgoing laser beam with incoming laser beam in a co-axial LiDAR system. However, the optical system 700 introduces several reflective surfaces, which can generate undesired laser signals. FIG. 8 illustrates how noises are generated by reflective surfaces in a LiDAR system 100.

FIG. 8 illustrates how the different reflective surfaces inside the lens system 108 generates noises. In FIG. 8, the polarization splitter 710 splits the outgoing laser beam into p-polarized portion 890 that exits through the surface 720 and reaches the mirror system 106, and s-polarization portion 850 that exits through the surface 741. Portion of the light ray 890 is reflected by the surface 720 and becomes the light ray 891. Portion of the light ray 890 is also reflected by the mirror system 106 and becomes the light ray 892. Portion of the light ray 850 may be reflected by the surface 741 and becomes the light ray 852. Portion of the light ray 850 may be reflected by the interior wall of the LiDAR system and becomes the light ray 851. As such, inside the optical system 700, light rays 891, 892, 851, 852 are undesired noises generated from the outgoing laser beams. These undesired noises may reach the light receiver 104 before any reflected laser beam. For this reason, the undesired noises generated from the outgoing laser beams are also referred to as preamble signals or preamble noises.

Figure 9:
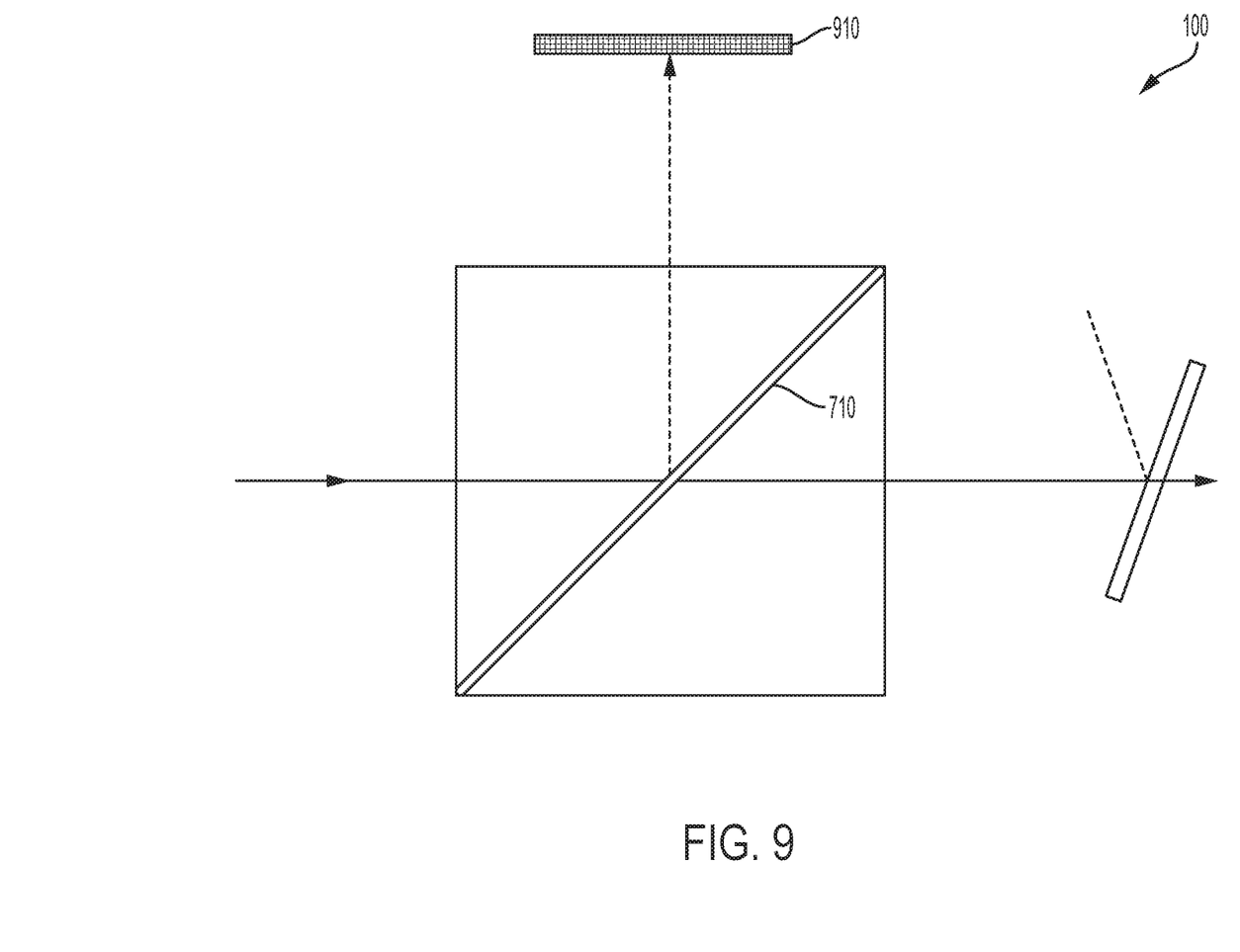
FIGS. 9-10 illustrate exemplary configurations of light absorption plate arrangement in a LiDAR device.
Figure 10:
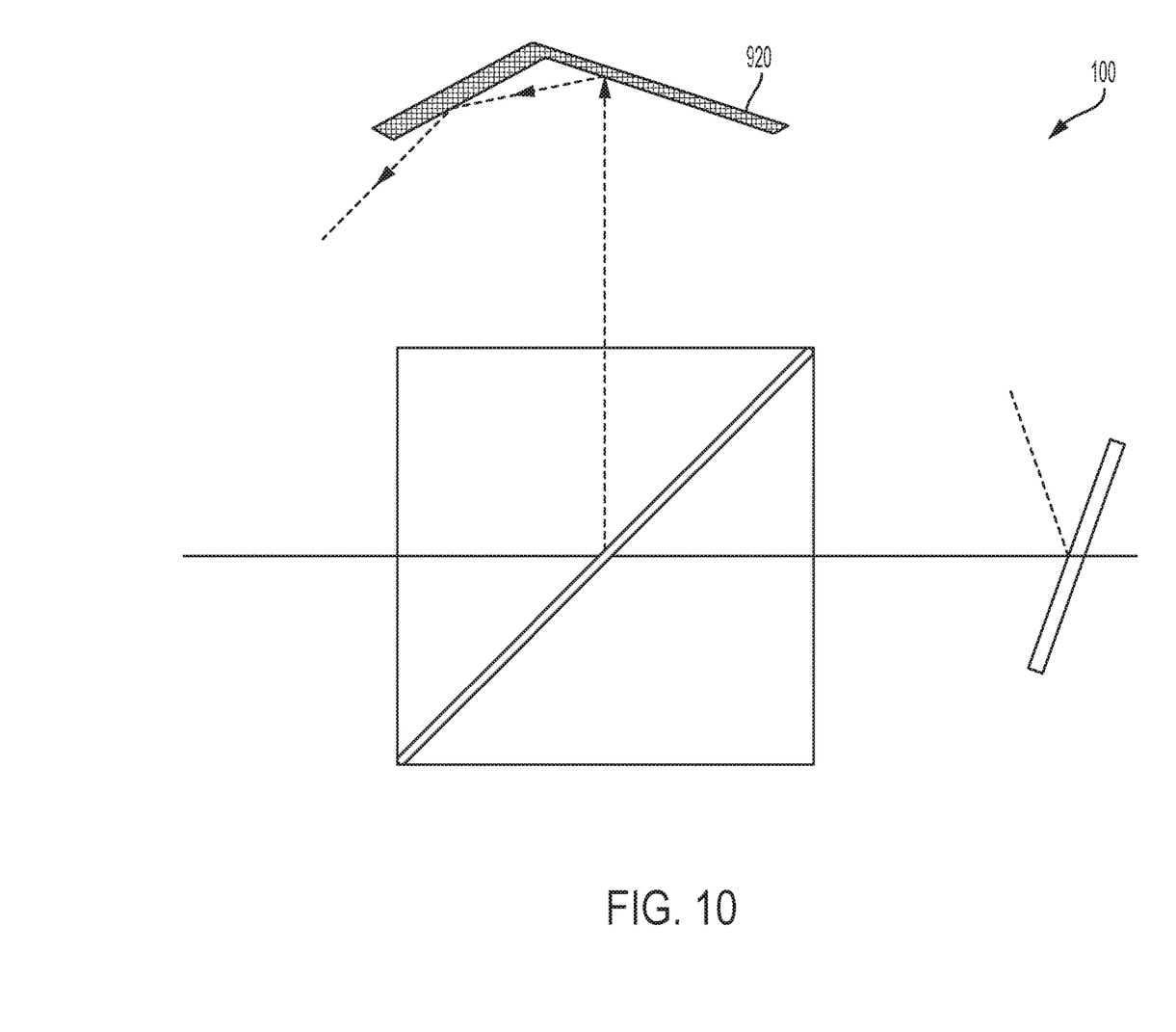

In some embodiments, to reduce or eliminate the unwanted noises, light absorption plate or plates are attached to the interior walls of the LiDAR system 100. For example, the light absorption plate may be placed to absorb the light ray 850 and eliminate the light ray 851. FIG. 9 and FIG. 10 illustrate two exemplary configurations of light absorption plates. In FIG. 9, the light absorption plate 910 is flat. In FIG. 10, the light absorption plate is a V-shaped plate. Light absorption plates of other shapes, such as U-shaped, step-shaped, can also be used.

Similarly, unwanted noises may be generated from the incoming laser beams when it goes through a series of reflective surfaces. Same methods and apparatus as disclosed herein can be utilized to improve signal to noise ratio (SNR).

FIG. 7-FIG. 10 depict a co-axial LiDAR system and the methods and apparatus disclosed in those figures may be applicable to bi-axial LiDAR systems as well, with or without modifications.

Although the disclosure is illustrated and described herein with reference to specific embodiments, the disclosure is not intended to be limited to the details shown. Rather, various modifications may be made in the details within the scope and range of equivalents of the claims and without departing from the disclosure.

What is claimed is:

1. A Light Detection and Ranging (LiDAR) system, comprising:
    a light source, said light source comprising a plurality of laser emitters, said plurality of laser emitters configured to generate an outgoing laser beam;
    a light receiver, said light receiver comprising a plurality of photon detectors and configured to detect a returned incoming laser beam;
    a mirror system for changing an outgoing direction of the outgoing laser beam; and
    a control system for controlling the LiDAR system;
    wherein the control system is configured to adjust the mirror system to direct the outgoing laser beam to a scanning region based on a scanning result derived from the returned incoming laser beam;
    wherein the control system comprises a closed-loop control module that includes two or more light sensors placed in a predicted trajectory of the outgoing laser beam, wherein the one or more light sensors are configured to detect a path of the outgoing laser beam, and wherein the closed-loop control system is configured to compare the detected path of the outgoing laser beam with a pre-determined path and if there is deviation between the detected path and the pre-determined path, to adjust, based on the comparison, a pulse period and frequency of the outgoing laser beam.

2. The LiDAR system of claim 1, wherein the control system is further configured to divide the scanning region into multiple sub-areas based on the scanning result.

3. The LiDAR system of claim 2, wherein the control system selects a priority zone from the multiple sub-areas, and wherein the priority zone is scanned with an increased resolution than other sub-areas.

4. The LiDAR system of claim 3, wherein the priority zone is selected to include an object detected in the scanning region.

5. The LiDAR system of claim 2, wherein the control system is configured to determine an error zone among the multiple sub-areas in which no object is detected.

6. The LiDAR system of claim 1, wherein the control system is configured to adjust the scanning region to include a detected object.

7. The LiDAR system of claim 6, wherein the control system is configured to control the laser beam to scan the adjusted scanning region with an increased resolution.

8. The LiDAR system of claim 1, wherein the control system is further configured to adjust an angle of the mirror system based on the comparison.

9. The LiDAR system of claim 1, further comprising a lens system positioned in between the light source and the mirror system, wherein the lens system comprises:
a polarizing splitter for splitting the laser beam into a first split laser beam and a second split laser beam, wherein the second split laser beam is p-polarized; and
a quarter-wave plate for converting the p-polarized laser beam into circular polarization.

10. The LiDAR system of claim 9, wherein
the quarter-wave plate is configured to convert the incoming laser beam into s-polarization, wherein the incoming laser beam is circularly polarized; and
the polarizing splitter for splitting the s-polarization incoming laser beam into a third split laser beam, wherein the third split laser beam is s-polarization.

11. The LiDAR system of claim 10, wherein the lens system further comprises a filter to substantially remove noise.

12. A control method of a LiDAR system, said LiDAR system comprising a light source for generating an outgoing laser beam, a light receiver, a mirror system and a control system, said LiDAR system control method comprising:
selecting a scanning region based on a scanning result;
positioning the mirror system to direct the outgoing laser beam towards the selected scanning region;
controlling the mirror system to move the outgoing laser beam to scan the selected scanning region;
analyzing received incoming laser beam when the outgoing laser beam scans the selected scanning region;
refining the scanning region based on the analyzing result of the received incoming laser beam for enhanced scanning;
detecting a path of the outgoing laser beam using two or more light sensors placed along a predicted trajectory of the outgoing laser beam;
comparing the detected path of the laser beam with a pre-determined path; and
if there is deviation between the detected path and the pre-determined path, adjusting the mirror system based on the comparison by adjusting a time interval between pulses of the outgoing laser beam.

13. The method of claim 12, wherein the refining of the scanning region based on the analyzing result of the received incoming laser beam comprises dividing the scanning region into multiple sub-areas and scanning one or more sub-areas with an increased resolution than the other sub-areas.

14. The method of claim 12, further comprising:
detecting an object inside the scanning region based on the received incoming laser beam;
selecting a priority zone that covers the detected object, and scanning the priority zone with an increased resolution compared to the resolution used outside the priority zone.

15. The method of claim 13, further comprising determining an error zone, among the multiple sub-areas, in which no object is detected.

16. The method of claim 12, wherein the adjusting of the mirror system comprises adjusting an angle of the mirror system.

17. The method of claim 12, further comprising:
generating periodic laser beam pulses according to a code table, wherein the code table contains a sequence of codes, and each laser beam pulse is encoded with a code sequentially selected from the code table.

18. The method of claim 17, wherein the light receiver receives an incoming laser beam pulse, further comprising:
decoding the code of the received laser beam pulse;
identifying the corresponding outgoing laser beam pulse using the code;
calculating the time difference between the transmitting time of the corresponding outgoing laser beam pulse and the arrival time of the incoming laser beam pulse; and
deriving the distance between the LiDAR system and the object upon which the incoming laser beam pulse is reflected based on the time difference.

19. The method of claim 18, wherein each code in the code table indicates the power level of a laser pulse.

20. The method of claim 18, wherein each code in the code table represents the time interval between consecutive laser beam pulses.

21. The method of claim 18, further comprising:
when the corresponding outgoing laser beam pulse cannot be identified, treating the received laser beam pulse as noise.

22. The method of claim 18, further comprising:
determining an expected time interval for receiving a next laser beam pulse; and
treating a received laser beam pulse as noise if the next laser beam pulse is not received within the expected time interval.

23. A LiDAR control system, comprising:
a LiDAR device comprising a light source, a light receiver and a mirror system;
a detection module configured to send detection signals to a scanning region and to receive returned detection signals; and
a closed-loop control module for controlling the LiDAR device, wherein the control module is configured to generate a reference signal based on data collected on the returned detection signals and to send a reference signal to the LiDAR device, wherein the reference signal is used to control the LiDAR device, and wherein the closed loop control module includes two or more light sensors placed on a predicted trajectory of the outgoing laser beam, wherein the one or more light sensors are configured to detect a path of the outgoing laser beam, and wherein the closed-loop control system is configured to compare the detected path of the laser beam with a pre-determined path and if there is deviation between the detected path and the pre-determined path, to adjust the mirror system based on the comparison by adjusting a time interval between pulses of the outgoing laser beam.

24. The LiDAR control system of claim 23, wherein the detection signals are radar, laser, or optical signals.

25. The LiDAR control system of claim 23, wherein the controlling of the LiDAR device comprises controlling the LiDAR device to increase a scanning resolution.

26. The LiDAR control system of claim 24, wherein the controlling of the LiDAR device comprises controlling the mirror system of the LiDAR device to scan a selected region with an increased resolution.

* * * * *